March 3, 1936.  A. J. GERHART  2,032,841
ELECTRIC SIGNALING DEVICE
Filed Dec. 14, 1932  2 Sheets-Sheet 1
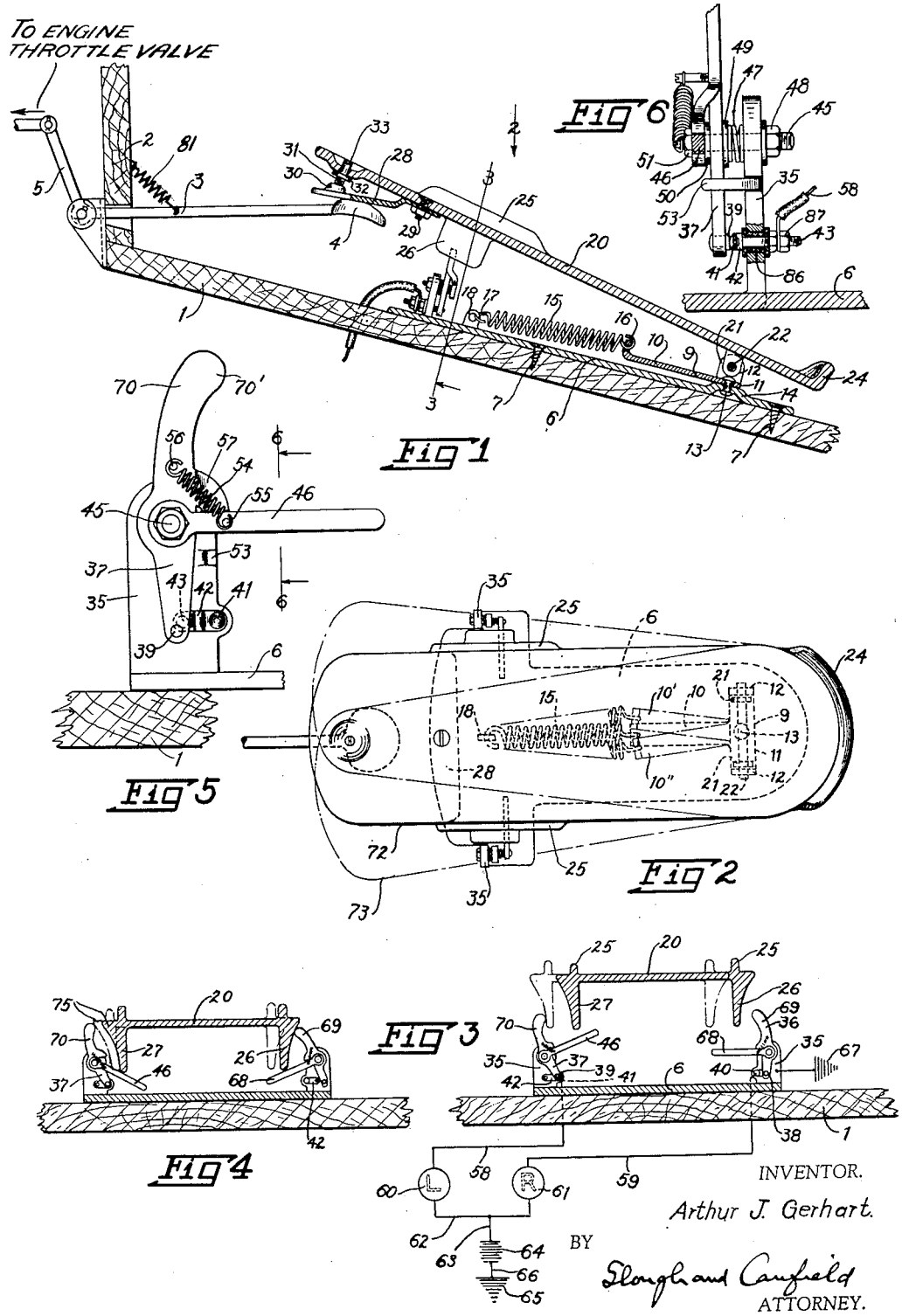
INVENTOR.
Arthur J. Gerhart.
BY
Slough and Canfield
ATTORNEY.

March 3, 1936.  A. J. GERHART  2,032,841
ELECTRIC SIGNALING DEVICE
Filed Dec. 14, 1932   2 Sheets-Sheet 2

INVENTOR.
Arthur J. Gerhart.
BY
Hough and Canfield
ATTORNEY.

Patented Mar. 3, 1936

2,032,841

UNITED STATES PATENT OFFICE 2,032,841

ELECTRIC SIGNALING DEVICE

Arthur J. Gerhart, Lorain, Ohio

Application December 14, 1932, Serial No. 647,107

10 Claims. (Cl. 177—337)

This invention relates to electric signaling devices and particularly to signaling devices for automotive vehicles to indicate the intended change of direction of movement of the vehicle.

It is an object of this invention to provide an improved signaling device or apparatus for automotive vehicles to indicate intended changes of direction of movement of the vehicle.

Another object is to provide an apparatus of the class referred to operable by directional movement of the vehicle driver's foot in an improved manner.

Another object is to provide a signaling apparatus of the class referred to adapted to be operated by directional movements of the driver's foot in connection with a foot-operated engine accelerator pedal in an improved manner.

Another object is to provide a signaling apparatus of the class referred to comprising electric signaling circuits and switches controlling the same and improved means for operating the switches.

Another object is to provide an apparatus of the class described comprising a unitary device for effecting the signaling adapted to be applied to existing motor vehicles and to be associated with the vehicle accelerator pedal in an improved manner.

Another object is to provide, in an apparatus of the class described, a device for effecting signaling in association with the vehicle accelerator pedal and comprising improved means for adapting or adjusting it to the accelerator pedals of different vehicles.

Another object is to provide a device of the class described which will be cheap to manufacture, efficient in operation and durable in use.

Another object is to provide such an apparatus which will be operable by the vehicle driver to effect signaling of intended changes of vehicle movement direction and requiring the minimum of attention or thought on the part of the driver in the operation thereof.

Other objects will be apparent to those skilled in the art to which my invention appertains.

My invention is fully disclosed in the following description taken in connection with the accompanying drawings, in which:

Fig. 1 is a longitudinal side sectional view of an embodiment of my invention applied to a conventional motor vehicle;

Fig. 2 is a view of the embodiment of Fig. 1 taken from the direction of the arrow 2 and with parts omitted for simplicity;

Fig. 3 is a cross-sectional view taken approximately from the plane 3—3 of Fig. 1;

Fig. 4 is a view similar to Fig. 3 illustrating parts thereof in different operative positions;

Fig. 5 is a view of a part of Figs. 3 or 4 to an enlarged scale;

Fig. 6 is a view taken from the plane 6—6 of Fig. 5.

Figure 7:
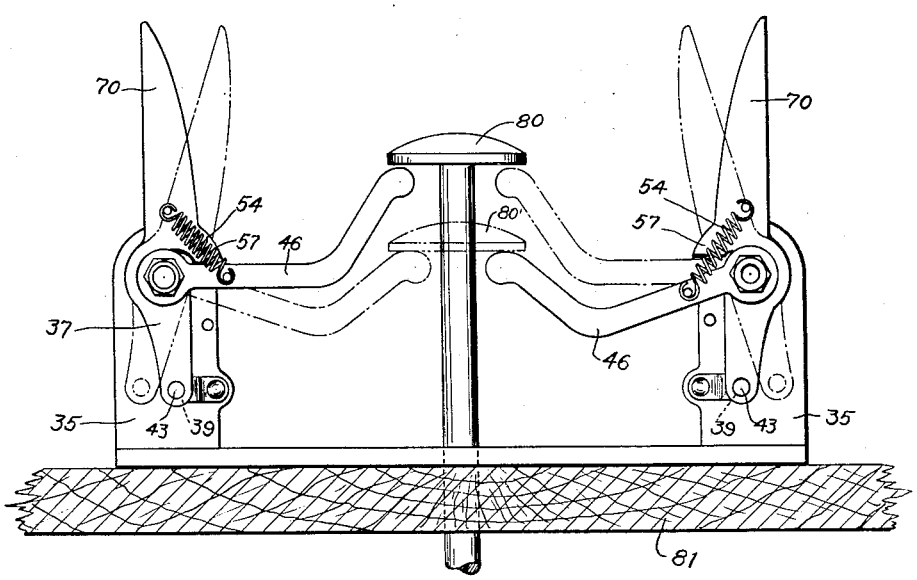
Fig. 7 is a view of a modified embodiment of my invention.

Referring to the drawings I have shown at 1 a part of the floor or floor boards and at 2 a part of the dash construction of a motor vehicle. At 3 I have shown an accelerator pedal having a portion 4 which ordinarily is engaged by the driver's foot to depress the same. The pedal 3, forwardly of the dash 2, has an arm 5 which may be connected in any suitable manner to the engine carburetor. As is common with such devices, upon depressing the pedal portion 4, the carburetor will be operated to supply more fuel to the engine to accelerate the same. Means such as a spring 81 may be provided to normally move the pedal portion 4 upwardly to the idling position, which is the position illustrated.

At 6 is a floor plate permanently installed and secured to the floor boards 1 in any suitable manner as for example by screws 7—7. A T-shaped bearing element 9 comprising a stem portion 10, a cross portion 11 and upstanding ears 12—12, is pivotally mounted on the floor plate 6 by a rivet or like means 13 projected through perforations in the floor plate 6 and the intermediate portion of the cross element 11 of the bearing element 9. A boss 14 may be pressed upwardly out of the floor plate 6 to dispose the bearing element 9 in clearance relation to the floor plate and by this construction the bearing element 9 may freely oscillate in a plane substantially parallel to the floor plate.

A tension spring 15 has one end 16 hooked in a suitable perforation in the end of the stem 10 and the other end 17 hooked in a lug 18 bent out of the material of the floor plate 6. The spring 15 is aligned with the stem portion 10 of the bearing element and its tension normally maintains the stem 10 in a central position. For operative purposes, the stem 10 may be moved to positions 10' or 10'' on opposite sides of its central position, as indicated in Fig. 2, and the spring 15 tends at all times to return the stem to its central position, as will be understood from the showing of Fig. 2.

A foot plate 20, preferably made from a casting and the major part of which is substantially planar and of oblong form, is pivoted near one end or its rearward end upon the cross portion 11 of the element 9, and for this purpose, a pair of lugs 21—21 are formed on the underside of the foot plate, spaced apart, and disposed between the lugs 12—12, and a shaft or pin 22 is projected through aligned perforations in the lugs 12 and the lugs 21.

By the construction thus far described it will now be apparent that the foot plate 20 may be rocked up and down in vertical planes around the shaft 22 and may also be rocked around the substantially vertical axis of the rivet 13 in generally horizontal planes.

On the rearward end of the foot plate 20 it may be provided with an upstanding flange 24 against which the heel of the driver's shoe may rest when his foot is positioned upon the foot plate 20 to operate it in a manner to be described. Forwardly of the shaft 22, the foot plate 20 is provided with a pair of depending lugs 26 and 27 laterally spaced apart and adapted to operate electric switches in a manner to be described. At the forward end of the foot plate, a portion thereof rests upon the accelerator pedal portion 4. In the practice of my invention, it is desirable to install the same in connection with foot boards 1 and a pedal portion 4 as found upon existing vehicles; and inasmuch as the distance from the floor board to the pedal portion 4 will vary in different cars, particularly different makes of cars, some flexibility or adjustment means is desirable in associating the foot plate therewith.

In the embodiment of my invention illustrated, this flexibility is provided by attaching a sheet metal plate 28 to the underside of the foot plate 20, as for example by bolts 29 and inclining the plate downwardly away from the foot plate and disposing the plate 28 directly above the pedal portion 4. The forward end of the plate 28 may, as at 30, be provided with a threaded portion into which a stud 31 is threaded, the stud having a shoulder 32, engaging a lower side portion of the foot plate 20 and a screwdriver slot 33 by which it may be turned.

By this construction, the plate 28 may be forcibly bent downwardly sufficiently to just engage the pedal portion 4 in its upper or idling position when the lugs 26 and 27 are in a preferred position to be referred to with respect to the switches to be operated thereby.

On opposite portions of the floor plate 6 is provided a pair of pedestals 35—35 having pivotally mounted thereon switch arms 36 and 37 carrying on their lower ends contacts 38 and 39 adapted to move into and out of engagement with corresponding stationary contacts 40 and 41 carried on the free ends of flat springs 42—42, the other ends of which are secured to bolts 43 mounted on the pedestals and insulated therefrom by well known insulating means 86 and threaded to receive nuts 87 to secure a circuit wire 38 to the bolts 43.

The switch arm 37 is pivotally mounted on a bolt 45 projected first through a perforation in a floating arm 46 extending laterally from the switch arm 37; and the bolt is then projected through the switch arm 37 and through a perforation in the pedestal 35.

By means of a compression spring 47 disposed between the pedestal 35 and the switch arm 37, and a nut 48 on the opposite side of the pedestal 35, the floating arm 46 and switch arm 37 are frictionally engaged with each other and with the pedestal 35 so that they normally tend to remain in any rotated position in which they are placed but may be displaced therefrom upon the application of sufficient force thereto.

If desired, washers 49 and 50 may be disposed between the switch arm 37 and the spring 47 and between the switch arm 37 and the floating arm 46.

Preferably the head 51 of the bolt 45 is disposed against the outer face of the floating switch arm 46, (see Fig. 6), and the nut 48 on the opposite side of the pedestal 35 whereby the tension of the spring 47 may be adjusted by turning the nut 48.

As shown in Fig. 5, a stop 53 may be provided on the pedestal 35 to limit the movement of the switch arm 37 to a position in which the contacts 39 and 41 will be engaged.

The floating switch arm 46 is connected to the switch arm 37 by a tension spring 54 hooked over projections 55 and 56 on the arms 46 and 37 respectively, and normally the tension of the spring 54 holds the switch arm 46 against a stop 57 on the switch arm 37 with the parts illustrated in Fig. 5.

In an operative manner to be described, if the switch arm 46 is depressed as viewed in Fig. 5, the tension of the spring 54 will be sufficient to overcome the friction of the spring 47 and rotate both arms clockwise in unison.

As illustrated in Fig. 3, circuit wires 58 and 59, connected respectively to the stationary contacts 41 and 40, connect serially with lamps 60 and 61 which may be given "left" and "right" significance by letters "L" and "R" thereon. The lamps 60 and 61 are connected by a wire 62 and by a wire 63 to a battery 64 and the battery may be connected to a ground 65 by a wire 66. The floor plate 6 may be connected to ground as at 67.

The pedestals 35—35 are so disposed on the floor plate 6 that, as shown in Figs. 2 and 3, the depending flanges 26 and 27 will be above the arms 46 and 68 respectively and inwardly laterally of upwardly extending portions 69 and 70 of the switch arms 36 and 37.

In the operation of the signaling mechanism and circuit above described, the foot plate 20 may be depressed at any time to depress the pedal portion 4 in the normal operation thereof.

When the driver desires to indicate a change of direction such as toward the left, he may move the foot plate 20 with his foot toward the left from the position illustrated at 72 to the position 73, Fig. 2, and from the solid line position to the dotted line position of Fig. 3. Ordinarily, the driver will approach such a turn with the engine idling, particularly on level ground or slightly downwardly inclined ground and thus the plate 20 will be in the upper position illustrated with the engine idling.

The movement of the foot plate 20 toward the left will cause the depending lug 27 to engage the extension 70 as shown in Fig. 3 and move the contacts 39 and 41 into engagement and close the circuit through the lamp L to indicate to traffic the intended change of direction, toward the left. After the driver has made the turn to the left and is ready to proceed, the normal operation of the vehicle is to depress the accelerator, and to do this the operator depresses the foot plate 20 whereupon the depending lug 27 will engage the switch arm 46 and rock the switch arm 37 to disengage the contacts and break the circuit.

It will thus appear that after the operator has once closed the circuit, no attention need there-after be given to it because the normal operation of depressing the pedal to accelerate the engine after the turn is made will automatically clear the signal.

Preferably the spring 15 is employed to automatically return the foot plate 20 to a central position after the signal circuit has been closed; but as will now appear, the spring 15 is not essential because even if the foot plate 20 remains in its signaling position toward the left, as viewed in Fig. 3, when it is subsequently depressed to accelerate the engine, the lug 27 will ride downwardly over the extension 70 and onto the arm 46 and operate the same to clear the signal.

If the vehicle is proceeding along an upwardly inclined roadway at the time it is desired to make the signal, the accelerator will naturally be depressed to maintain the engine in power and the plate 20 will be in a depressed position, as illustrated in Fig. 4, and thus normally tends to maintain both switches open as shown in the right-hand part of that figure.

Under these circumstances, to signal toward the left, the plate 20, (see Fig. 4), is forcibly moved toward the left by the operator while holding the pedal down whereupon the extreme lateral edge 75 of the plate 20 will engage the extension 70 of the switch arm; and although the arm 46 is at the time depressed, will forcibly move the switch arm 37 and close the switch contacts. For this purpose, the lateral edge 75 of the plate 20 is preferably formed to substantially overhang outwardly laterally the depending lug 27.

After the indicated turn or change of direction has been made, the driver either may move the plate 20 back to its central position or permit it to be moved back to the central position by the spring 15, whereupon the signal will be clear; but if he fails to give the necessary attention to its operation to effect the clearing of the signal in this manner, he may continue to hold the signal energized so long as the pedal is depressed and at the next release of the foot plate to release the accelerator pedal, the foot plate 20 will be returned to its central position by the spring 15 and upon the next succeeding depressive movement thereof, the lug 27 will engage the arm 68 and clear the signal as described above.

It will now be apparent that there are several modes of operation of the signaling apparatus above described but that a preferred mode of operation is possible whereby the only thought or attention on the part of the driver necessary to operate the system is that to close the switches selectively and to leave the opening thereof and the clearing signals to occur automatically by the normal operation of the foot plate 20 to control the acclerating pedal.

Thus in the preferred mode of operation, whether the accelerator is up in the idling position or down in the power position, it is only necessary, when signaling, to move the foot plate in the intended direction, that is, to right or left, and after that the thought of the driver may be removed from the signal entirely and it will, in the normal operation of the engine accelerator pedal, be cleared after the change of vehicle direction has been made.

In Fig. 3 the foot plate 20 is illustrated in its uppermost or idling position of the engine, and in Fig. 4 in its lowermost or maximum power position, but due to the overhang portion 75 of the foot plate and due to an inwardly bent end portion 70' of the arm 70, the signaling effect above produced may be performed in all intermediate positions of the foot plate 20, the lug 26 or 27 engaging the portion 70' of the arm over the first part of the downward range of the plate 20 and the overhang portion 75 engaging the arm 70 on the rest of the downward range.

In Fig. 7 I have shown a modification of my invention in which the foot plate 20 and its associated parts are omitted. In this form, the parts of the switch mechanism are operated by the pedal in conjunction with the operator's foot. In this form, a pair of switch devices such as illustrated in Fig. 5 are employed and the electric circuit thereto may be the same as those hereabove described. In this form, however, a part of the accelerator pedal 80 overhangs the inner ends of the floating switch arms 46—46; so that upon depressing the pedal 80, these arms will be depressed. The operator's foot on the top of the pedal 80 may depress the pedal or may optionally be moved to the left or to the right to move into direct engagement with the extensions 70 to operate the switches.

The two pedestals 35—35 upon which the switch devices are mounted may be supported on a plate 6 secured directly to the floor boards 81 to dispose the arms 46 and the extensions 70 in proper relation to the pedal 80.

In operation of the form of Fig. 7, the two devices are normally disposed in the solid line position of the right-hand device as viewed in Fig. 7. When the engine is in the idling or lightly running condition, the accelerator pedal 80 is substantially in its upper position, illustrated in solid lines. If, under these circumstances, the operator desires to signal a change of direction, say to the left, he moves his foot laterally to the left and engages it against the extension 70 and rocks that extension and the switch arm 37 and arm 46 into the solid line position illustrated closing the switch contacts 43 and 39 to energize the "left" signal. Subsequently thereto, upon depressing the pedal 80 to give the engine more power, the arm 46 will be moved downwardly and rock the switch arm 37 to disengage the contacts 39—43, the parts then taking up a normal position illustrated in solid lines in the right-hand half of the figure, the depressed position of the pedal being illustrated at 80'.

If, however, the pedal 80 is in a depressed position such as 80' or any intermediate position and the operator wishes to signal a change of direction, say for example to the right, he will move his foot to the right and engage it with the extension 70 and forceably move it to the dotted line position in the right-hand half of the figure engaging the contacts 39—43, forceably moving the extension 70 against the tension of the spring 54.

After the vehicle turn to the right has been made, the driver may release his foot from the extension 70 to clear the signal, or if his attention is not directed to this mode of operation, the signal will automatically clear the next time the operator releases the accelerator pedal since by so doing he releases the pressure on the extension 70 as well as on the pedal 80. But if, without thinking, the operator should maintain the signal closed, he will clear it the next time he depresses the pedal 80.

The pedal 80 may be constrained to move to the solid line position by a spring or like means, not shown, as may likewise the pedal portion 4 of Fig. 1, such means usually being provided at the carburetor, on reacting through the operating connections between the carburetor and the pedal.

My invention is not limited to the exact details of construction shown and described. Many changes and modifications may be made therein without changing the scope and spirit of the invention or sacrificing its advantages.

I claim:—

1. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical, means causing the pedal to move to a normal elevated position and permitting the pedal to be depressed, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal.

2. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical, means causing the pedal to move to a normal elevated position and permitting the pedal to be depressed, means tending to return the pedal to a neutral position after said supplemental movements, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal.

3. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical and away from a neutral position, and permitting movement back to said neutral position after said supplemental movements, means causing the pedal to move to a normal elevated position and permitting the pedal to be depressed, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal.

4. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical, means causing the pedal to move to a normal elevated position and permitting the pedal to be depressed, means tending to return the pedal to a neutral position after said supplemental movements, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal, and means for retaining the engaged contacts in engagement upon return of the pedal to the said neutral position.

5. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical and away from a neutral position, and permitting movement back to said neutral position after said supplemental movements, means causing the pedal to move to a normal elevated position and permitting the pedal to be depressed, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means being operable individually to engage the contacts of either circuit by corresponding supplemental movements of the pedal, and means for retaining the engaged contacts in engagement upon return of the pedal to the said neutral position.

6. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical, means causing the pedal to move to a normal elevated position and permitting the pedal to be depressed, means tending to return the pedal to a neutral position after said supplemental movements, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal, means to retain the engaged contacts in engagement upon return of the pedal to the said neutral position, and means to operate the switch means to disengage the contacts upon depressive movement of the pedal.

7. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical and away from a neutral position, and permitting movement back to said neutral position after said supplemental movements, means causing the pedal to move to a normal elevated position and permitting the pedal to be depressed, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal, means to retain the engaged contacts in engagement upon return of the pedal to the said neutral position, and means to operate the switch means to disengage the contacts upon depressive movement of the pedal.

8. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical, means causing the pedal to move to a normal elevated position and permitting the pedal to be depressed, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal, and means for retaining the engaged contacts in engagement upon depressive movement of the pedal.

9. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical, means causing the pedal to move to a normal elevated position and permitting the pedal to be depressed, means tending to return the pedal to a neutral position after said supplemental movements, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal, and means for retaining said engaged contacts in engagement upon depressive movement of the pedal and for operating the said switch means to disengage the engaged contacts upon return of the depressed pedal to said neutral position.

10. In a signal apparatus for automotive vehicles of the type comprising an engine and a movable fuel supply controlling element, a pedal, a support for the pedal permitting generally vertical movements thereof and permitting supplemental movements thereof in two directions at angles to the vertical and away from a neutral position, and permitting movement back to said neutral position after said supplemental movements, means causing the pedal to move to a normal elevated position and permitting the pedal to be depressed, transmitting means adapted to be connected to the fuel supply controlling element, for transmitting vertical movements of the pedal to the fuel supply controlling element, a pair of electric signal means including energizing circuits therefor and a pair of electric switch means including engageable and disengageable contacts controlling each circuit, means rendering the pair of switch means operable individually to engage the contacts of either circuit by corresponding supplemental movements of the pedal, and means for retaining said engaged contacts in engagement upon depressive movement of the pedal and for operating the said switch means to disengage the contacts upon return of the depressed pedal to said neutral position.

ARTHUR J. GERHART.